LITHIUM COPPER MANGANESE FERRITE STORAGE CORE MATERIAL

Filed May 14, 1968

FIG. 1

ATOM NUMBER

| NO | Li | Cu | Mn | Fe |
|---|---|---|---|---|
| 1 | 0.025 | 0.183 | 1.037 | 1.754 |
| 2 | 0.051 | 0.173 | 0.982 | 1.794 |
| 3 | 0.076 | 0.163 | 0.927 | 1.834 |
| 4 | 0.101 | 0.154 | 0.871 | 1.874 |
| 7 | 0.100 | 0.050 | 1.300 | 1.550 |
| 17 | 0.450 | 0.050 | 0.500 | 2.000 |
| 21 | 0.100 | 0.050 | 0.988 | 1.862 |
| 22 | 0.100 | 0.100 | 0.938 | 1.862 |
| 31 | 0.100 | 0.300 | 0.550 | 2.050 |

FIG. 2

MOL %

| NO | $Li_2O$ | CuO | MnO | $Fe_2O_3$ |
|---|---|---|---|---|
| 1 | 0.60 | 8.67 | 49.16 | 41.56 |
| 2 | 1.22 | 8.34 | 47.26 | 43.18 |
| 3 | 1.86 | 7.99 | 45.31 | 44.84 |
| 4 | 2.52 | 7.64 | 43.29 | 46.55 |
| 7 | 2.30 | 2.30 | 59.77 | 35.63 |
| 17 | 12.68 | 2.82 | 28.17 | 56.34 |
| 21 | 2.48 | 2.48 | 48.94 | 46.11 |
| 22 | 2.48 | 4.95 | 46.46 | 46.11 |
| 31 | 2.60 | 15.58 | 28.57 | 53.25 |

FIG. 3

WEIGHT %

| NO | $Li_2O$ | CuO | MnO | $Fe_2O_3$ |
|---|---|---|---|---|
| 1 | 0.17 | 6.37 | 32.20 | 61.27 |
| 2 | 0.33 | 6.06 | 30.62 | 62.98 |
| 3 | 0.50 | 5.75 | 29.05 | 64.71 |
| 4 | 0.67 | 5.43 | 27.45 | 66.45 |
| 7 | 0.67 | 1.80 | 41.64 | 55.89 |
| 17 | 3.27 | 1.93 | 17.23 | 77.57 |
| 21 | 0.67 | 1.77 | 31.26 | 66.30 |
| 22 | 0.67 | 3.54 | 29.62 | 66.18 |
| 31 | 0.66 | 10.47 | 17.11 | 71.77 |

FIG. 4

FIRING CYCLES

| NO | 1st STEP | 2nd STEP |
|---|---|---|
| 1 | 1140°C - 3'25" | 880°C - 6' |
| 2 | 1160°C - 4'30" | 910°C - 4' |
| 3 | 1155°C - 4'30" | 890°C - 4' |
| 4 | 1160°C - 5' | 890°C - 4' |
| 7 | 1150°C - 2' | 900°C - 15' |
| 17 | 1175°C - 4' | COOL TO 950°C |
| 21 | 1150°C - 2'15" | 950°C - 15' |
| 22 | 1155°C - 4'55" | 890°C - 4' |
| 31 | 1150°C - 7' | COOL TO 950°C |

PULSE TEST CONDITIONS TEMP. 40°C, 2:1 DRIVE CURRENTS 872/436 ma PULSE PATTERN TR, TF = 50 ns, TD = 175 ns

| NO | $uV_1$ | $rV_1$ | wVz | Tp | Ts | ΔN Tp | ΔN Tp+30ns | Tc °C | TEMP. COEF 0-40°C |
|---|---|---|---|---|---|---|---|---|---|
| 45 | 81 | 74 | 6.5 | 76 | 119 | 1.40 | .60 | 315 | .77 |
| 1 | 76 | 72 | 4.0 | 84 | 141 | .425 | .20 | 321 | .56 |
| 2 | 70.5 | 64.5 | 4.5 | 90 | 150 | .37 | .15 | 350 | .55 |
| 3 | 73 | 70 | 3.5 | 87 | 152 | .325 | .20 | 370 | .54 |
| 4 | 69 | 66.5 | 4.0 | 91 | 157 | .275 | .10 | 376 | .524 |
| 21 | 77 | 72 | 5.0 | 90 | 152 | .51 | .22 | 363 | .505 |
| 22 | 72 | 67.8 | 4.5 | 92 | 150 | .37 | .14 | 360 | .51 |
| | | | | | | | | $T_R, T_F = 50$ NS | $T_D = 475$ NS |
| 7 | 63.5 | 58 | 5.0 | 80 | 136 | .95 | .50 | 280 | .74 |
| 17 | 50 | 47 | 3.0 | 108 | 180 | .15 | .10 | 463 | .48 |
| 31 | 38 | 35 | 4.5 | 122 | 200 | .225 | .20 | 426 | .46 |

FIG. 5

INVENTORS
ROBERT C. TURNBULL
DERRY J. DUBETSKY
REYNIER W. DAM

BY Bertram H. Mullin
ATTORNEY 3,583,918

LITHIUM COPPER MANGANESE FERRITE STORAGE CORE MATERIAL

Robert C. Turnbull, Poughkeepsie, Reynier W. Dam, Rhinebeck, and Derry J. Dubetsky, Beacon, N.Y., assignors to International Business Machines Corporation, Armonk, N.Y.

Filed May 14, 1968, Ser. No. 728,975
Int. Cl. C04b *35/36*
U.S. Cl. 252—62.61 2 Claims

ABSTRACT OF THE DISCLOSURE

A fast switching, square loop, temperature stable, ferrite core, suitable for computer applications is provided. The composition consists of the oxides or carbonates or the like of lithium, copper, manganese and iron in predetermined proportions. The components are mixed shaped, fired and quenched to obtain the storage core of the desired properties.

BACKGROUND OF THE INVENTION

(1) Field of the invention

The present invention relates to ferrite storage core compositions and the method of manufacturing the same for a ferrite containing lithium, copper, manganese, iron and oxygen in predetermined proportions. Such compositions find wide application in the data processing and computer fields.

(2) Description of the prior art

Square loop ferrites are widely employed as magnetic storage elements and pulse transfer controlling devices in computer and other information processing machines. These ferrites are generally synthesized by mixing selected constituent metallic oxides in predetermined portions, processing the mixture to a ferrite powder by conventional ceramic methods, pressing the powder into rigid shape and thereafter sintering the pressed material at a high temperature. This causes the constituents to react and diffuse on an atomic scale to form a ferrospinel type of crystal structure having two stable states and a response excitation characteristic of a substantially square hysteresis loop.

Various combinations of lithium manganese ferrites and copper manganese ferrites are known in the art. However, no core composition and method have been suggested that provides the lithium copper manganese core with the properties required; namely, fast switching, square loop properties, temperature stability and low delta noise for computer applications.

(3) Summary

Now what has been discovered is that a lithium copper manganese ferrite having the following composition in atom parts satisfies the requirements heretofore referred to:

$$Li_xCu_yMn_zFe_{3-(x+y+z)}O_4$$

where $x$ lies between 0.025 to 0.45 inclusively;
where $y$ lies between 0.05 to 0.30 inclusively;
where $z$ lies between 0.5 to 1.30 inclusively;
where $3-(x+y+z)$ lies between 1.55 to 2.05 inclusively.

It has been found that such a core composition exhibits fast switching, a square hysteresis loop, temperature stability and low delta noise.

Further in accordance with the present invention, the method of preparing the above composition is presented. This includes the steps of first weighing out the raw materials for the core constituents, and, thereafter, dry blending the same. That mixture is then calcined between 600° C. to 800° C. for a selected period of time. That product is ball milled and a milling vehicle such as deionized water, methyl or ethyl alcohol is used. The ball milled slurry is dried into a cake, repulverized and granulated. During this step, approximately 4% by weight of a binder such as polyvinyl alcohol and approximately 1% by weight of lubricant such as dibutyl phthalate is added. The binder and lubricant are pre-mixed in water prior to addition to the basic slurry. The resulting product is then pressed into cores with a green density between 2.5 to 4.0 g./cc. The cores are then placed in a platinum boat, inserted into a furnace with a temperature in the range between 1050° C. to 1350° C. for a period between 1½ to 30 minutes. The cores are then removed and placed in a second furnace with a temperature range between 750° C. to 1050° C. for 2 to 90 minutes. Alternatively, the cores may be cooled in the original furnace to the heretofore mentioned temperature range. The last step of the process entails cooling or quenching the cores to room temperature.

Thus, it is a primary object of this invention to provide a lithium cooper manganese ferrite core composition exhibiting fast switching, square loop properties, temperature stability and low delta noise for computer applications.

It is a further object of the invention to provide an economical and commercially feasible process for making a lithium copper manganese core exhibiting fast switching, square loop properties, temperature stability and low delta noise.

The foregoing and other objects, features and advantages of the invention will be apparent from the following more particular description of the preferred embodiments of the invention.

BRIEF DESCRIPTION OF THE DRAWINGS

FIG. 1 is a table presenting various compositions of the inventive core compositional system in atom numbers.

FIG. 2 is a table presenting the various compositions of the inventive core compositional system in mol percent.

FIG. 3 is a table presenting the various compositions of the inventive core compositional system in weight percent.

FIG. 4 is a table presenting the firing cycles of the various compositions of the inventive core compositional system.

FIG. 5 is a table presenting the magnetic and electrical properties of the various core compositions of the inventive core compositional system as compared to the properties of a copper manganese ferrite core.

DESCRIPTION OF THE PREFERRED EMBODIMENTS

Before proceeding with the description of the preferred embodiments of the invention, reference is made to U.S. Pat. 3,083,164 of E. C. Leaycraft et al., issued Mar. 26, 1963, wherein the definition of the various magnetic and electrical parameters used to describe the properties of the inventive core compositional system in FIG. 5 are explained in detail. However, these parameters are briefly reviewed to facilitate the appreciation of the inventive concept:

$uV_1$ is the undisturbed one signal in millivolts;
$rV_1$ is the disturbed one signal in millivolts;
$wV_z$ is the disturbed zero signal in millivolts;
$T_p$ is the time it takes a signal pulse to reach peak time in nanoseconds;
$T_s$ is the switching time of the core in nanoseconds;
$\Delta N_{T_p}$ is a measure of the delta noise at peak time.

This results from the nature of the selection operation in a coincident current, ferrite core. The stored information is subject to various disturb patterns which may alter the magnetization states of the core. The half-select read currents produce noise during the reading process which tends to mask the signal. Although the sense segment of the core is wound in a manner such as to minimize the difference in signal between pairs of cores, the cancellation is not perfect. This imbalance between two-half select signals is called delta noise.

$\Delta T_p+30$ is the delta noise 30 nanoseconds after peak time is reached per pair of cores.

$T_c$ ° C. is the Curie temperature in ° C.

Temp. Coef. is the temperature coefficient of the cores. It is measured by taking the difference in the threshold in milliamperes for causing switching at two temperatures (0 and 40° C.), dividing that by the temperature difference (40° C.) and thereafter dividing that by the average in threshold currents in milliamperes.

TR is the rise time of a pulse in nanoseconds.

TF is the fall time of a pulse in nanoseconds.

TD is the duration of the pulse between rise time and fall time in nanoseconds.

Now returning to the discussion of the description of the preferred embodiment.

695.1 grams of $Fe_2O_3$, 505.6 grams of $MnCO_3$, 85.8 grams of $CuCo_3Cu(OH)_2$ and 13.36 grams $Li_2CO_3$ are weighed and then dry blended. The mixture is calcined at 750° C. with a heating rate of 150° C./hour; the mixture is then held at temperature for two hours and then cooled at a rate of 200° C./hour. The calcined powder is ball milled for a period of 16 to 20 hours with a milling vehicle of deionized water, methyl alcohol or ethyl alcohol. The ball milled slurry is dried into a cake, repulverized and granulated, at which time approximately 4% by weight of binder (polyvinyl alcohol) and 1% by weight of lubricant (dibutyl phthalate) is added. The binder and lubricant are pre-mixed in water prior to addition to the basic slurry. The product is then pressed into cores with a green density between 2.5 to 4.0 grams/cc. The cores are then placed in a platinum boat, inserted into a furnace, maintained at a temperature of 1155° C. and held there for four minutes and thirty seconds. Thereafter, the cores are either inserted into a second furnace maintained at 890° C. and held there for four minutes or the original furnace is lowered to the second temperature for the required period of time. Thereafter, the cores in the platinum boat are removed and cooled at room temperature. This results in a ferrite core having the following composition:

$$Li_{0.076}Cu_{0.183}Mn_{0.927}Fe_{1.834}O_4$$

The properties of such a ferrite core composition are illustrated by Example 3 of FIG. 5. Example 45 is a copper manganese ferrite of the following composition:

$$Cu_{0.19}Mn_{1.09}Fe_{1.72}O_4$$

Comparing Example 3 to Example 45, it is seen that Example 3 has better squareness, fast switching characteristics, greater temperature stability and an appreciably lower delta noise output.

From the other examples presented in FIGS. 1 to 3, from the firing cycles of these examples presented in FIG. 4, it is seen that a lithium copper manganese ferrite core composition having the general formula:

$$Li_xCu_yMn_zFe_{3-(x+y+z)}O_4$$

where $x$ lies between 0.025 to 0.45 inclusively;
where $y$ lies between 0.05 to 0.30 inclusively;
where $z$ lies between 0.5 to 1.30 inclusively;
where $3-(x+y+z)$ lies between 1.55 to 2.05 inclusively;

exhibits fast switching, square loop properties, temperature stability and low delta noise.

Such a core is calcined at a temperature between 600° C. to 800° C., pressed to a green density between 2.5 to 4.0 grams/cc., fired to a temperature in the range between 1050° C. to 1350° C., cooled to a temperature in the range between 750° C. and 1050° C. and thereafter cooled to room temperature.

While there has been shown and described and pointed out the fundamental novel features of the invention as applied to a preferred embodiment thereof, it will be understood that various admissions and substitutions and changes in the form in detail of the invention illustrated and its operation may be varied by those skilled in the art without departing from the invention. It is the intention thereof to be limited only as indicated by the scope following in the claims.

What is claimed is:

1. A method of forming a square loop fast-switching lithium copper manganese ferrite with low delta noise characteristic and temperature stability where said ferrite composition is represented by the following formula in atom parts:

$$Li_xCu_yMn_zFe_{3-(x+y+z)}O_4$$

where $x$ lies between 0.025 to 0.45
where $y$ lies between 0.05 to 0.30
where $z$ lies between 0.5 to 1.30
where $3-(x+y+z)$ lies between 1.55 to 2.05 said method including the steps of:

firing said composition for a period of 1½ to 30 minutes in the temperature range of about 1050° C. to 1350° C.; and cooling said ferrite composition to room temperature with interim continuation of heating for a period of 2 to 90 minutes in the temperature range 750° C. to 1050° C.

2. The method of forming lithium copper manganese ferrite storage cores possessing qualities of high temperature stability, low delta noise output, square hysteresis loop characteristic and fast switching response comprising:

preparing cores in a green state having a density of 2.5 to 4 grams/cc. by press molding material extracted from a calcined ball-milled mixture consisting essentially of granulated ferrite having the compositional formula in atom parts:

$$Li_xCu_yMn_zFe_{3-(x+y+z)}O_4$$

where $x$, $y$, $z$ and $3-(x+y+z)$ have respective numerical value ranges: 0.025 to 0.45, 0.05 to 0.30, 0.5 to 1.30 and 1.55 to 2.05; and sintering said green cores in a firing cycle consisting of 1½ to 30 minutes of heating in the temperature range 1050° C.–1350° C. followed by cooling to room temperature with holdover heating in the intervening temperature range 750° C.–1050° C. for a discrete period of 2–90 minutes.

References Cited

UNITED STATES PATENTS

| | | | |
|---|---|---|---|
| 3,065,182 | 11/1962 | Aghajanian | 252—62.61X |
| 3,477,960 | 11/1969 | Wickham | 252—62.6 |
| 3,483,126 | 12/1969 | Sara et al. | 252—62.6X |

JAMES E. POER, Primary Examiner

J. COOPER, Assistant Examiner